(12) United States Patent
Yamazaki

(10) Patent No.: US 6,799,776 B2
(45) Date of Patent: Oct. 5, 2004

(54) HYBRID INFLATOR

(75) Inventor: Masayuki Yamazaki, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/149,984

(22) PCT Filed: Oct. 17, 2001

(86) PCT No.: PCT/JP01/09110
§ 371 (c)(1),
(2), (4) Date: Jun. 13, 2002

(87) PCT Pub. No.: WO02/32728
PCT Pub. Date: Apr. 25, 2002

(65) Prior Publication Data
US 2002/0190510 A1 Dec. 19, 2002

(30) Foreign Application Priority Data
Oct. 19, 2000 (JP) ......................................... 2000-319459

(51) Int. Cl.[7] .............................................. B60E 21/26
(52) U.S. Cl. ...................................... 280/737; 280/741
(58) Field of Search ................................ 280/737, 736, 280/740, 742

(56) References Cited
U.S. PATENT DOCUMENTS

| | | | |
|---|---|---|---|
| 5,529,333 A | 6/1996 | Rizzi et al. .................. | 280/737 |
| 5,732,972 A | 3/1998 | Johnson et al. .............. | 280/737 |
| 5,788,275 A | 8/1998 | Butt ............................ | 280/737 |
| 5,938,235 A | 8/1999 | Butt ............................ | 280/737 |
| 6,068,292 A | 5/2000 | Renz ........................... | 280/737 |
| 6,234,523 B1 * | 5/2001 | Tokoro et al. .............. | 280/737 |
| 6,540,256 B2 * | 4/2003 | Iwai et al. ................... | 280/736 |

FOREIGN PATENT DOCUMENTS

JP 10-100851 A 4/1998 ........... B60R/21/26

* cited by examiner

Primary Examiner—Michael J. Carone
Assistant Examiner—Kimberly S. Smith
(74) Attorney, Agent, or Firm—Birch, Stewart, Kolasch & Birch, LLP

(57) ABSTRACT

A hybrid inflator which easily controls the amount of outflow of a pressurized medium or the like is provided. Part of a plurality of nozzles 166 positioned in a flow-passage of a pressurized medium or the like are closed by a tape 160 to be ruptured due to increase of an internal pressure. When the internal pressure is low, the tape 160 is not ruptured, but when the internal pressure is high, the tape 160 is ruptured. Therefore, the opening area of the nozzles 166 are changed in accordance with the change in internal pressure so that the amount of the outflow of the pressurized medium and the like can be controlled.

14 Claims, 3 Drawing Sheets

HYBRID INFLATOR

This application is the national phase under 35 U.S.C. §371 of PCT International Application No. PCT/JP01/09110 which has an International filing date of Oct. 17, 2001, which designated the United States of America

BACKGROUND OF THE INVENTION

1. Field of the Invention

The present invention relates to an inflating-type safety system for a motor vehicle, more specifically to a hybrid inflator capable of inflating an air bag rapidly and reliably regardless of an environmental temperature in a practical use and to an air bag apparatus using the hybrid inflator.

2. Description of Related Art

With the development of an inflator for an inflating-type safety system of motor vehicles, a hybrid inflator using both a pressurized gas and a solid gas generating agent has been attracting attention. A main design requirement for a hybrid inflator is that the inflator inflates an air bag to a predetermined amount in a predetermined time so that the air bag is effectively activated. Various proposals concerning a structure to meet the requirement have heretofore been made, where the art disclosed in JP-A No. 10-100851 and the like have been known as prior art.

SUMMARY OF THE INVENTION

An object of the present invention is to provide a hybrid inflator capable of inflating an air bag rapidly and reliably and has a high safety, and to provide an air bag apparatus using such a hybrid inflator.

The present invention provides, as one means for solving the above problem, a hybrid inflator for an inflating-type safety system of a vehicle provided with an air bag, which comprises an inflator housing filled with a pressurized medium, a gas generator stored in the inflator housing and provided with at least one gas generating chamber containing gas generating means, and ignition means jointed to the gas generator, wherein a flow-passage, through which the pressurized medium flows at the time of activation of the hybrid inflator, is closed on the midway by a main rupturable plate, and a plurality of nozzles for controlling the amount of outflow of the pressurized medium and combustion gas are provided at the passage, through which the pressurized medium flows.

Incidentally, in the present invention, the passage, through which the pressurized medium flows at the time of activation of the hybrid inflator, can be set properly or modified according to the structure of the hybrid inflator.

The present invention is structured such that a change in an internal pressure inside the hybrid inflator is controlled by controlling the amount of outflow of the pressurized medium and the combustion gas according to function of a plurality of the nozzles provided at the passage through which the pressurized medium flows, and in case that the present invention is applied to an air bag system, the air bag can be inflated rapidly and reliably without influence of an environmental temperature in practical use.

Furthermore, the hybrid inflator of the present invention can be structured such that a plurality of the nozzles for controlling the amount of outflow of the pressurized medium and the combustion gas are provided at a flow-passage of the pressurized medium upstream of the main rupturable plate.

Thus, in a case that a plurality of the nozzles are provided at the flow-passage upstream of the main rupturable plate, for example, a hybrid inflator with the following respective structures may be provided.

One structure can be that a portion upstream of the main rupturable plate of the flow-passage for the pressurized medium is formed of a cylindrical member, one end side of the cylindrical member faces the main rupturable plate while the other end side thereof is closed, and a plurality of the nozzles comprising through-holes are provided in a side wall of the cylindrical member.

Other structure can be that a portion upstream of the main rupturable plate of the flow-passage for the pressurized medium is formed of a cylindrical member, one end side of the cylindrical member faces the main rupturable plate, and the other side thereof is provided with a plurality of the nozzles comprising through-holes. In this case, no nozzle is provided in a side wall of the cylindrical member.

Still other structure can be that a portion upstream of the main rupturable plate of the pressurized medium is formed of a cylindrical member, one end side of the cylindrical member faces the main rupturable plate, and the other end side and a side wall are provided with a plurality of the nozzles comprising through-holes.

Also, the hybrid inflator of the present invention can be structured such that a plurality of the nozzles for controlling the amount of outflow of the pressurized medium and the combustion gas are provided downstream of the main rupturable plate of the flow-passage for the pressurized medium.

Thus, in a case that a plurality of the nozzles is provided in the flow-passage downstream of the main rupturable plate, such a structure can be employed that a portion downstream of the main rupturable plate of the flow-passage is formed of a cylindrical member, one end side of the cylindrical member faces the main rupturable plate and the other end side and/or the side wall are provided with a plurality of the nozzles comprising through-holes. For example, a plurality of discharging ports for the pressurized medium and the combustion gas from the hybrid inflator, which is positioned downstream of the main rupturable plate of the flow-passage can be constituted as nozzles.

In the hybrid inflator of the present invention, nozzles may be provided upstream of the main rupturable plate of the flow-passage or downstream of the main rupturable plate of the flow-passage or at both the portions, but it is preferable that the nozzle is provided at the portion upstream of the main rupturable plate of the flow-passage.

In the present invention, respective opening areas of a plurality of the nozzles may be made equal to one another, or they may be made different from one another. The opening area of the nozzle is set such that the amount of outflow of the pressurized medium and the combustion gas can be controlled to a desired degree according to the performance and application required for the hybrid inflator. Since the opening area of the nozzle corresponds to a nozzle diameter, when it is expressed by the nozzle diameter, the nozzle diameter may preferably be 1 to 8 mm, more preferably 1 to 6 mm.

Also, the total opening area of a plurality of the nozzles may preferably be 40 to 120 mm$^2$, more preferably 60 to 90 mm$^2$, and the number of nozzles should be determined in relation to the total opening are of the nozzles, and it may be preferably 2 to 8, more preferably 4 to 6.

Thus, by adjusting the opening areas of a plurality of the nozzles or the total area thereof, control on the amount of outflow of the pressurized medium and the combustion gas and control on the change in the internal pressure of the hybrid inflator can be performed more easily.

In the present invention, such a structure can be employed that a plurality of the nozzles are closed by shielding means, and a closed state by this shielding means is selected according to the position where a plurality of the nozzles are provided. When a plurality of the nozzles are provided in the flow-passage upstream of the main rupturable plate, such a structure can be employed that part of a plurality of the nozzles are closed by the shielding means (that is, a state such that shielded nozzles and opened nozzles exist). When a plurality of the nozzles are provided in the flow-passage downstream of the main rupturable plate, such a structure can be employed that part or all of a plurality of the nozzles are closed by the shielding means.

This shielding means is ruptured according to increase in internal pressure of the hybrid inflator at the activation thereof. When all of a plurality of the nozzles are closed by the shielding means, it is preferable that pressures required to rupture the respective shielding means are different. For example, in a case that there are six nozzles, breaking pressures of the respective shielding means can be made different one by one or by grouping two or three. The pressure by which the shielding means is broken can be adjusted by changing the diameter of the nozzle, the strength (thickness, material or the like) of the shielding means, or the like.

By changing the pressure required to rupture the shielding means variously, rupturing easiness (i.e., long/short in rupturing time) of the shielding means can be changed in a group of nozzles, so that the amount of outflow of the pressurized medium and the combustion gas can be controlled.

By closing the nozzles by the shielding means in this manner, the control on the amount of outflow of the pressurized medium and the combustion gas and the control on change of the internal pressure in the hybrid inflator can be made easier. That is, since by burning a gas generating means to generate a combustion gas with a high temperature, the internal pressure in the hybrid inflator is gradually increased, the shielding means is ruptured according to the increase in the internal pressure so that the total opening area of the nozzles is changed in a stepwise manner. Therefore, the amount of outflow of the pressurized medium and the combustion gas can be controlled so that the change of the internal pressure in the hybrid inflator can be controlled. Thereby, particularly, a desirable pressure curve such as shown in FIG. 3 can be obtained.

The strength of the shielding means used in the present invention must be adjusted by thickness, material quality or the like such that the shielding means can be ruptured according to the change of the internal pressure in the hybrid inflator. The change of the internal pressure at the actuation of the hybrid inflator varies according to various requirements in application of the hybrid inflator to an air bag system, for example, a mounting position of the air bag in a vehicle interior (for a driver side, a front passenger side, a rear passenger side or the like), a vehicle model, an environmental temperature during use of the air bag system, but it is preferable to use a tape having a thickness of 30 to 300 $\mu$m as the shielding means, it is more preferable to use a tape having a thickness of 30 to 80 $\mu$m. A material for the tape is not limited to a specific one, but metal, for example, stainless steel or aluminum, is preferable.

The pressurized medium used in the hybrid inflator of the present invention includes an inert gas such as argon, helium (nitrogen is also included in the inert gas in the present invention), etc., and it may contain oxygen as required. Argon promotes thermal expansion of the pressurized medium. It is preferable to contain helium in the pressurized medium since the leakage of the pressurized medium can be detected easily for the purpose of preventing distribution of the imperfect products. Also, oxygen converts carbon monoxide or hydrogen generated due to the combustion of the gas generating agent, serving as the gas generating means, into carbon dioxide or water steam. A charging pressure (=pressure in the inflator housing) of the pressurized medium is preferably 10,000 to 70,000 kpa, and more preferably 30,000 to 60,000 kPa. Incidentally, the pressurized medium may contain oxygen or it may not contain oxygen. When the pressurized medium contains oxygen, the content of oxygen is preferably at most 30 mol %.

As the gas generating means used in the present invention, a gun propellant can be used for example. As the gun propellant, a single-base gun propellant, a double-base gun propellant and a triple-base gun propellant can be used. In addition to them, it is possible to use a gun propellant obtained by mixing a secondary explosive, a bonding agent, a plasticizer and a stabilizer and the like, and molding the resultant mixture to a desired shape.

The secondary explosive can include hexahydrotrinitrotriazine (RDX), cyclotetramethylene tetranitramine (HMX), pentaerithritol tetranitrate (PETN) and triaminoguanidinenitrate (TAGN). For example, when a gas generating agent using RDX as a secondary explosive is burned in an oxygen-absent atmosphere under a pressure of 20,670 kPa and at a combustion temperature of 3348 K, a formed gas in a combustion gas comprises 33 mol % of nitrogen, 25 mol % of carbon monoxide, 23 mol % of vapor, 8 mol % of carbon dioxide and other gas components.

The bonding agent may include cellulose acetate, cellulose acetate butylate, cellulose acetate propiolate, ethyl cellulose, polyvinyl acetate, azide polymer, polybutadiene, polybutadiene hydride, and polyurethane; the plasticizer may include trimethylolethane trinitrate, butantriol trinitrate, nitroglycerine, bis(2,2-dintropropyl)acetal/formal, glycidyl azide, acetyltriethl citrate, and the like; and the stabilizer may include ethlcentralite, diphenylamine, and loesosinol.

A preferable ratio of the secondary explosive to the bonding agent, plasticizer, and stabilizer is about 50 to 90 wt. % of secondary explosive to about 10 to 50 wt. % of bonding agent, plasticizer and stabilizer in all.

Also, in addition to the above-described gas generating means, as the gas generating means used in the present invention, it is possible to use a gas generating agent including the below described fuel and oxidizer, or the fuel, oxidizer and slag-forming agent, which are mixed with bonding agent, if required, and formed into a desired shape.

It is preferable to use a gas generating agent in a perforated cylindrical shape having at least a single through-hole or non-through-hole (a non-penetrating hole). By using such a perforated cylindrical gas generating agent, combustion of the gas generating agent is promoted, so that operating performance of the hybrid inflator can be improved.

Such a perforated cylindrical gas generating agent can be set properly such that its outer diameter (R), inner diameter (d), and length (L) fall in a range allowing application to the hybrid inflator. In a case of a single-perforated cylindrical gas generating agent having a single through-hole, it is preferable that the outer diameter thereof is 6 mm or less and the ratio (L/W) of the length to the thickness (W) (=(R−d)/2) is not less than 1. In a case of a porously perforated cylindrical gas generating agent having at least two through-holes, it is preferable that the outer diameter thereof is 60 mm or less and the ratio (L/W) of the length to the thickness (W) (when a plurality of holes are arranged uniformly, a distance between adjacent holes, and when they are not arranged uniformly, the average value of respective distances between adjacent holes) is not less than 1. Furthermore, in a case of a cylindrical gas generating agent with at least a single non-through-hole, it is preferable that the outer diameter thereof is 60 mm or less, the ratio (L/W) of the length to the thickness (W) (the same definition as that in the porously perforated cylindrical one is applied) is not less than 1, and the ratio (W'/W) of the thickness W' (a distance between a bottom portion of the non-through-hole and a bottom of the cylindrical portion) of a non-through-hole portion to the thickness W is 0.5 to 2.

In this gas generating agent, a gas generated by its combustion can be supplied together with the pressurized medium for inflation and development of the airbag. In the present invention, especially, when a gas generating agent including a slag-forming agent is used, the amount of mist discharged from the inflator can be reduced much.

Preferably, the gas generating agent contains a non-azide organic compound except for a nitramine-based compound. The gas generating agent containing the nitramine-based compound may include propellant compositions disclosed in the specification of U.S. Pat. No. 5,507,891 and in claims thereof. For example, it may include compositions containing cyclotrimethylenetrinitramine (RDX) or cyclotetramethylenetetranitramine (HMX). In addition thereto, there are propellants disclosed in JP-A No. 8-282427 and in claims therein. For example, it may include secondary explosive and binders disclosed in Claim 32. The secondary explosive may include RDX, HMX, PETN, TAGN, and the like described in Claim 34 of the Publication, and the binders may include a composition containing a bonding agent such as CA, CAB, CAP, EC, PVA as described in claims 37 and 38.

As the fuel containing the non-azide organic compound except for the nitramine-based compound, the following nitrogen containing compounds may be used. Examples of the fuel can be one or mixture of two or more selected from the group consisting of triazole derivatives, tetrazole derivatives, guanidine derivatives, azodicarboxylic acid amide derivatives, and hydrazine derivatives. Specific examples thereof may include 5-oxo-1,2,4-triazole, tetrazole, 5-aminotetrazole, 5,5-bi-1H-tetrazole, guanidine, nitroguanidine, cyanoguanidine, triaminoguanidine nitrate, guanidine nitrate, guanidine carbonate, burette, azodicarbonamide, carbohydrazide, carbohydrazide nitrate complex, dihydrazide oxalate, hydrazine nitrate complex, and the like.

Preferably, the fuel may be one or two or more materials selected from a group consisting guanidine derivatives such as nitroguanidine (NQ), guanidine nitrite (GN), guanidine carbonate, amino nitroguanicine, amino guanidine nitrite, amino guanidine carbonate, diamino guanidine nitrite, diamino guanidine carbonate, and triamino guanidine nitrite. However, it is not limited thereto.

As an oxidizer, one or two or more materials selected from a group comprising strontium nitrate, potassium nitrate, ammonium nitrate, potassium perchlorate, copper oxide, ferrous oxide, and basic copper nitrate may be used.

Preferable composition amount of oxidizer is 10 to 80 parts by weight, and more preferably, 20 to 50 parts by weight with respect to 100 parts by weight of fuel.

Preferably, the slag-forming agent may be one or two or more materials selected from a group consisting of acid clay, talc, bentonite, diatomaceous earth, kaolin, silica, alumina, sodium silicate, silicon nitride, silicon carbide, hydrotalsite, and a mixture thereof.

Preferable composition amount of slag-forming agent is 0 to 50 parts by weight, and more preferably, 1 to 10 parts by weight with respect to 100 parts by weight of fuel.

Preferably, the bonding agent may be one or two or more materials selected from a group consisting of sodium salt of sodium carboxymethylcellulose, hydroxyethyl cellulose, starch, polyvinyl alcohol, guar gum, microcrystal cellulose, polyacrylamide, and calcium stearate.

Preferable composition amount of the bonding agent is 0 to 30 parts by weight, and more preferably, 3 to 10 parts by weight with respect to 100 parts by weight of fuel.

The present invention can be applied to one (single type) in which a gas generator includes a single gas generating chamber storing a gas generating means, one (dual type) in which the gas generator includes two gas generating chambers, and one in which the gas generator includes three or more gas generating chambers. The arrangement in a case of having two or more gas generating chambers is not limited to a specific one. For example, in a case of having two gas generating chambers, such a structure may be employed that the two gas generating chambers are arranged in series and adjacent to each other in the longitudinal direction, that they are arranged in series but being separated from each other in the longitudinal direction, that they are arranged in parallel and adjacent to each other in the widthwise direction, or that they are arranged in parallel but being separated to each other in the widthwise direction. Incidentally, the case that the gas generating chambers are arranged in parallel to each other in the widthwise direction may include a case such that the two gas generating chambers are arranged concentrically so that either of the gas generating chambers is arranged outside the other, or a case such that the two gas generating chambers each having a widthwise semi-circular section are arranged in the widthwise direction.

In the hybrid inflator of the present invention, the gas generating means may be kept in a normal pressure atmosphere. It is preferable that the gas generating means is kept in the normal pressure atmosphere rather than in a pressurized atmosphere, since the gas generating means hardly deteriorates by pressure. If the gas generating means is deteriorated by the pressure, there is a possibility such that the gas generating means may be smashed easily at combustion.

Further, the present invention provides an air bag apparatus comprising activation-signal outputting means including an impact sensor and a control unit, and a module case which accommodates the above-described hybrid inflator and an air bag.

In the present invention, a "gas generator" functions to generate a high temperature combustion gas due to combustion of the gas generating means (gas generating agent) in the gas generating chamber, thereby introducing the high temperature combustion gas into the inflator housing. And, the hybrid inflator includes the gas generator in an inflator housing thereof, and the "inflator" functions to introduce the pressurized medium, which exists inside of the inflator housing but outside of the gas generator, towards the outside due to a function of the high temperature combustion gas discharged from the gas generator, thereby inflating an inflatable material such as an air bag. The "hybrid" means a combination of the high temperature combustion gas generated by combustion of the gas generating agent and the pressurized medium.

In the hybrid inflator of the present invention, the amount of outflow of the pressurized medium and the combustion gas may be controlled easily so that, when the hybrid inflator is applied to an air bag apparatus, the air bag may be inflated rapidly and reliably without being affected by an environmental temperature.

DETAILED DESCRIPTION OF THE INVENTION

Figure 1:
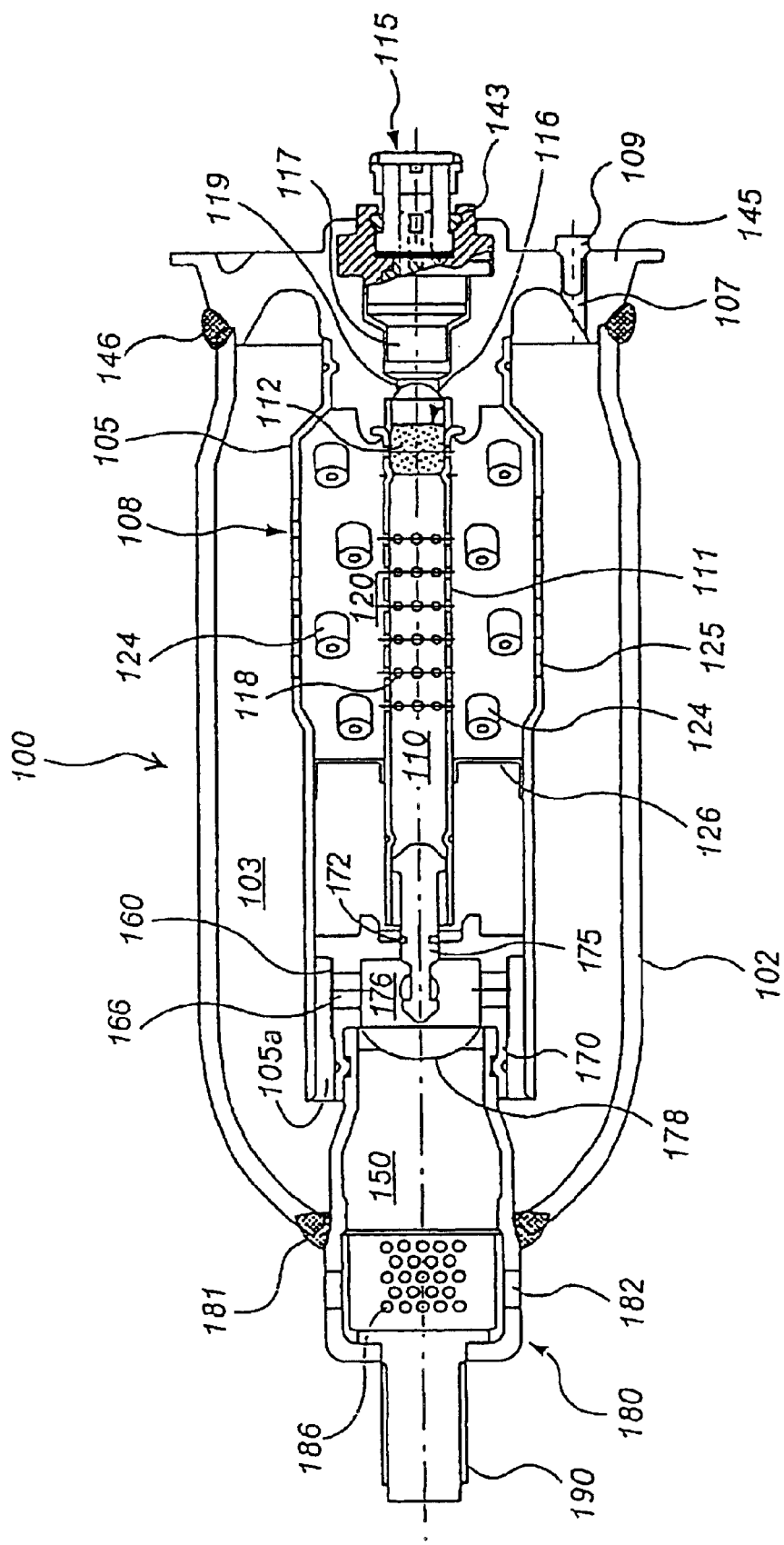
FIG. 1 is a longitudinal sectional view showing one embodiment of a single type hybrid inflator of the present invention.

The present invention will be explained in detail as follows with reference to the drawings showing embodiments of the invention. FIG. 1 is a sectional view in the longitudinal direction of one embodiment of a single type hybrid inflator 100 having a single gas generating chamber 120.

As shown in FIG. 1, an inflator housing 102 comprises a cylindrical pressure resisting container, and its inner space 103 is filled with a pressurized medium and maintained at a high pressure. The pressurized medium is usually charged from a small hole 107 formed in a boss 145 connected to one end of the inflator housing 102, and the small hole 107 is closed by a seal pin 109 after the pressurized medium was charged. The inflator housing 102 can be formed to have a uniform outer diameter except at its end portion on the side of a diffuser 180 (flat outer shape without constriction or the like).

An outer shell of a gas generator 108 is formed by a gas generator housing 105. The gas generator 108 includes, therein, a charge-transferring chamber 110, and a gas generating chamber 120 formed to surround the charge-transferring chamber 110 and disposed adjacent in series in the longitudinal direction of the inflator housing 102. The gas generator 108 is disposed in the inflator housing 102, and its one end in its longitudinal direction is fixed to the boss 145 by welding.

The charge-transferring chamber 110 comprises a cylindrical charge-transferring-chamber housing 111, and is connected to an initiator 117 for ignition through a booster cup 116, in which a booster agent (transfer charge) 112 is charged, and a communication passage closed by a rupturable plate 119 as main closing means. The charge-transferring chamber 110 is in communication with the gas generating chamber 120 through flame transferring holes 118.

The gas generating chamber 120 is provided to surround the charge-transferring chamber 110, and is defined by the housing 111 of the charge-transferring chamber 110, a partition wall 126, and the boss 145. A required amount of gas generating agent 124, as gas generating means, is accommodated in the gas generating chamber 120. The gas generating chamber 120 and the inner space 103 defined by the inflator housing 102 are in communication with each other through a plurality of communication holes 125, and a diameter of a plurality of communication holes 125 is controlled such that the gas generating agent 124 does not escape out of the gas generating chamber 120.

As mentioned above, since the charge-transferring chamber 110 is in communication with the gas generating chamber 120 and the gas generating chamber 120 is in communication with the inner space 103 defined by the inflator housing 102, both the charge-transferring chamber 110 and the gas generating chamber 120 are maintained at a high pressure, i.e., the same pressure as that inside the inflator housing 102 (inner space 103).

The initiator 117 for ignition is accommodated in an ignition means chamber 115 formed in the boss 145, the initiator 117 for ignition is mounted to the boss 145 via a initiator collar 143, and the boss 145 is fixed to the inflator housing 102 at a connecting portion 146 by welding or the like.

A cylindrical adapter 170, functioning as a flow-passage of the pressurized medium, is connected to an extended portion of the charge-transferring chamber 110. A projectile 175 having the illustrated shape for rupturing a main rupturable plate 178 at the time of activation is mounted, through an O-ring 172, to an opening that brings the charge-transferring chamber 110 and the adapter 170 into communication with each other such that the projectile 175 extends from the charge-transferring chamber 110 to the adapter 170. Therefore, the opening that brings the charge-transferring chamber 110 and the adapter 170 into communication with each other is closed by the projectile 175.

A tip end of the projectile 175 is located in the inner space 176 of the adapter 170. The inner space 176 and the inner space 103 of the inflator housing 102 are in communication only through a plurality of nozzles 166 provided by perforating a side surface (a surface facing an inner surface of the housing 105) of the adapter 170. A plurality of the nozzles 166 may be provided in the flow-passage of the pressurized medium upstream of the main rupturable plate 178. A gas flow path 105a is defined by the inner surface of the housing 105 and an outer surface of the adapter 170. Therefore, the pressurized medium in the inner space 103 flows always into the nozzles 166 through the gas flow path 105a at the time of activation.

Shielding means 160 (for example, a stainless tape having a thickness of 30 to 80 μm) is attached to part of a plurality of nozzles 166 with adhesive. For example, when six nozzles are provided, three nozzles thereof are closed while the other three nozzles are opened. Incidentally, opening areas (or diameters) of the plurality of nozzles 166 are equal to each other or are different from each other.

Also, in the hybrid inflator of the present invention, nozzles corresponding to the plurality of nozzles 166 maybe provided at the flow-passage of the pressurizing medium downstream of the main rupturable plate 178. In such a case, for example, such nozzles may correspond to a plurality of diffuser ports (gas discharging ports) 182. Part or all of a plurality of diffuser ports 182 can be closed with a member equivalent to the shielding means 160 described above.

A diffuser 180 is connected to one end of the inflator housing 102. The diffuser 180 is fixed at a connecting portion 181 by welding. The main rupturable plate 178, as closing means, is mounted to the end of the diffuser 180 facing the projectile 175 in order to block a flow-passage of the pressurized medium towards the diffuser port 182 before activation. Therefore, before activation, a gas inflow space 150 and the inner space 103 of the inflator housing 102 are completely isolated from each other by the main rupturable plate 178 and thus, transmittance of the pressurized medium is blocked out.

The other end of the diffuser 180 is provided with the plurality of diffuser ports 182 for introducing the pressurized medium to an air bag and also with a diffuser screen 186 for removing fine particles. A stud bolt 190 for connecting the inflator 100 to the air bag module is fixed to the outer surface of the diffuser 180.

In the hybrid inflator 100, it is preferable that the above-described constituent elements are arranged symmetrically in the widthwise direction with respect to the center axis (shown as the chain line in FIG. 1), but some or all of the constituent elements may be arranged eccentrically with respect to the center axis.

The air bag system of the present invention comprises activation-signal outputting means including an impact sensor and a control unit, and a module case accommodating the hybrid inflator 100 and an air bag. The hybrid inflator 100 is connected to the activation-signal outputting means (the impact sensor and the control unit) in the initiator 117 side, and the hybrid inflator 100 is connected and fixed by screwing the stud bolt 190 onto the module case in which the air bag is mounted. In the air bag system having such a structure, it is possible to adjust the amount of generated gas in accordance with a degree of impact, and to adjust the inflating speed of the air bag by appropriately setting the output condition of the activation signal in the activation-signal outputting means.

Next, the operation of the hybrid inflator 100 will be explained with reference to FIG. 1.

Before the hybrid inflator 100 is activated, the pressurized medium charged in the inflator housing 102 under a high pressure flows into the gas generating chamber 120 through the communication holes 125, and further flows into the charge-transferring chamber 110 through the flame-transferring holes 118 such that the interiors of these chambers are maintained at the same high pressure. Further, since the projectile 175 is mounted to extend from the inner space 176 to the charge-transferring chamber 110, both of which being maintained at the same pressure, malfunction is prevented.

In the event of a vehicle collision, the initiator 117 for ignition is activated and ignited by the activation-signal outputting means to rupture the rupturable plate 119 and then, the booster agent 112 in the charge-transferring chamber 110 is ignited to generate a high temperature booster gas.

When the pressure inside the charge-transferring chamber 110 is increased by the generated booster gas, the projectile 175 pushed by this pressure moves to rupture the main rupturable plate 178 with the sharp tip end thereof. At that time, a portion of booster gas flows into the gas inflow space 150 due to the rupture of the main rupturable plate 178.

Most of the booster gas flows into the gas generating chamber 120 through the flame-transferring holes 118 to ignite and burn the gas generating agent 124, and a predetermined amount of a high temperature combustion gas (corresponding to the charged amount of the gas generating agent 124) is generated.

Thereafter, since the high temperature combustion gas flows through the communication holes 125 into the inflator housing 102 to increase the pressure therein, the pressed pressurized medium flows into the gas flow-passage 105*a* to pass through the nozzles 166 and further flows into the gas inflow space 150 via the ruptured main rupturable plate 178.

At this time, when the pressure inside the hybrid inflator 100 is low, the pressurized medium and the combustion gas flow out only through the open nozzles 166 among a plurality of the nozzles 166. However, when the pressure is high, the shielding means 160 is ruptured and the closed nozzles 166 are opened so that the pressurized medium and the combustion gas flow out through all the nozzles 166.

Since the total opening area of a plurality of the nozzles 166 is changed according to change of the internal pressure (i.e., since the shielding means 160 is ruptured and the closed nozzles 166 are opened), the amount of outflow of the pressurized medium and the combustion gas can be controlled and thus, the following operation is conducted in practice.

In the case that the hybrid inflator is applied to an airbag apparatus mounted on a vehicle, an environment where a vehicle is used varies so that an environmental temperature in an actual use includes temperatures varying between a low temperature of −30° C. or −20° C., a normal temperature, and a high temperature of 50° C. or 60° C., and naturally, the internal pressure inside the hybrid inflator at a time of activation changes due to influence of the environmental temperature.

Therefore, at a time of activation under a low temperature atmosphere (at a time of a combustion under a low temperature), the internal pressure inside the hybrid inflator becomes low. In such a case, some of the nozzles 166 is kept closed to reduce the total opening area so that the internal pressure is prevented from decreasing rapidly, thereby controlling the amount of outflow of the pressurized medium and the combustion gas. At this time, if all the nozzles 166 are open (i.e., when the total opening area is too large), most of the pressurized medium flows outside at once in the initial stage of activation and reduces the internal pressure, and thereby the burning rate of the gas generating agent becomes slow so that the air bag can not be inflated sufficiently within a predetermined time.

On the contrary, at a time of activation under a high temperature atmosphere (at a time of a combustion under a high temperature), the internal pressure inside the hybrid inflator becomes high. In such a case, the closed nozzles 166 are opened by rupturing the shielding means 160 to increase the total opening area, and thereby the internal pressure is prevented from increasing excessively so that the amount of outflow of the pressurized medium and the combustion gas can be restricted. At this time, if some of the nozzles 166 are kept closed (i.e., when the opening area is too small), the internal pressure is excessively high to overstep the pressure strength of the inflator housing 102, and, as a result, the hybrid inflator may break.

As described above, the hybrid inflator of the present invention is structured to conduct the above-described operation by changing the total opening area of the nozzles in accordance with combustion at a high temperature or combustion at a low temperature. In general, since the maximum internal pressure at a time of a combustion during a low temperature of the hybrid inflator is 15,000 to 20,000 kPa, and the maximum internal pressure during a normal temperature is 30,000 to 35,000 kPa, by setting a threshold value at which the shielding means is ruptured to 30,000 kPa, the shielding means is not ruptured even at a time of combustion under a low temperature until the internal pressure reaches 30,000 kPa so that the total opening area of the nozzles is maintained in a small range and a rapid lowering of the internal pressure is prevented. As a result, the amount of outflow of the pressurized medium and the combustion gas is controlled, and thereby the air bag can be inflated sufficiently within the predetermined time.

Also, when the threshold value is set to 30,000 kPa, the shielding means is ruptured at a time of combustion during a normal temperature or a high temperature and all the nozzles are opened, and therefore, the amount of outflow of the pressurized medium and the combustion gas is controlled so that the air bag can be inflated sufficiently within the predetermined time.

The pressurized medium and the combustion gas that flow into the gas inflow space 150 through the nozzles 166 in this manner pass through the diffuser screen 186 and are ejected from the diffuser ports 182 to inflate the air bag mounted to the air bag module.

Figure 2:
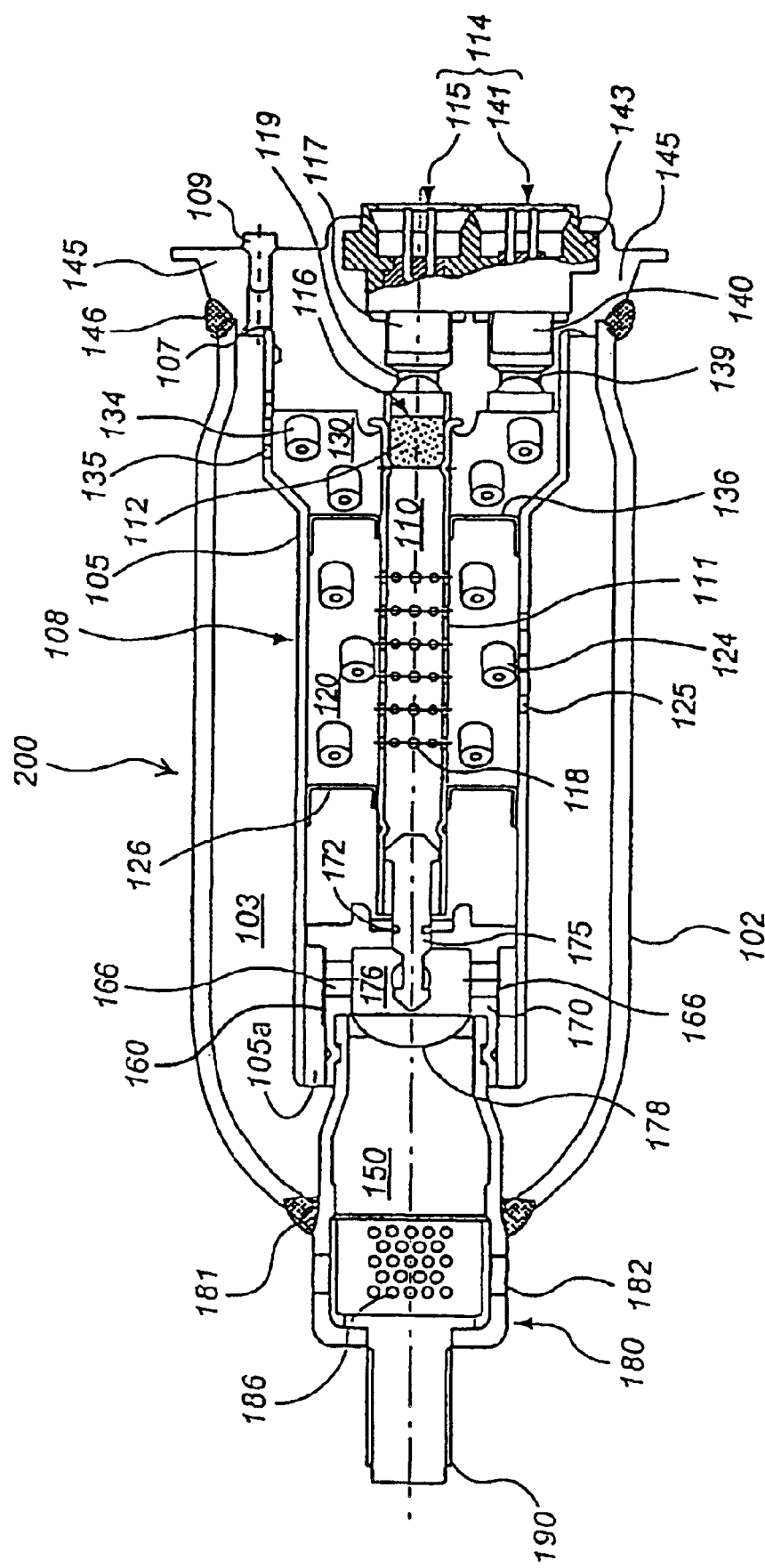
FIG. 2 is a longitudinal sectional view showing one embodiment of a dual type hybrid inflator of the present invention.

Next, another embodiment of the present invention will be explained with reference to FIG. 2. FIG. 2 is a sectional view in the longitudinal direction of one embodiment of a dual-type hybrid inflator 200 having two gas generating chambers. Incidentally, parts and members designated by the same reference numerals as those in FIG. 1 are the same parts or members as those in FIG. 1. Reference numeral 115 denotes a first ignition means chamber, 117 denotes a first initiator for ignition, 119 denotes a first rupturable plate, 120 denotes a first gas generating chamber, 124 denotes a first gas generating agent, 125 denotes first communication holes, 141 denotes a second ignition means chamber, 140 denotes a second initiator for ignition, 139 denotes a second rupturable plate, 130 denotes a second gas generating chamber, 134 denotes a second gas generating agent, and 135 denotes second communication holes.

The dual-type hybrid inflator 200 shown in FIG. 2 is operated in the same manner as the hybrid inflator 100 shown in FIG. 1 except that the combustion starts simultaneously in the first gas generating chamber 120 and the second gas generating chamber 130 to generate a combustion gas, or the combustion in the second gas generating chamber 130 starts slightly after the combustion in the first gas generating chamber 120. Accordingly, even in this hybrid inflator 200, the air bag can be inflated sufficiently due to the functions of the shielding means 160 and the nozzles 166 within the predetermined time even under a low temperature or a high temperature atmosphere.

EXAMPLE

The present invention is described more specifically below by referring to an Example. However, the present invention is not limited thereto.

Example 1

A single-type hybrid inflator 100 shown in FIG. 1 was produced. A total of five nozzles 166 (the total opening area A=80.8 mm$^2$) including two nozzles with a diameter of 5 mm and three nozzles with a diameter of 4.2 mm were formed on the side surface of the adapter 170. Two nozzles with a diameter of 5 mm and one nozzle with a diameter of 4.2 mm among the total nozzles 166 were open (the total opening area of 53.1 mm$^2$), while two nozzles with a diameter of 4.2 mm were completely closed from the outside with a stainless tape (thickness of 40 μm) (the total opening area of 27.7 mm$^2$) Incidentally, the other conditions are as follows:

Pressurized medium: 2.6 mol (100 g) of a mixed gas of argon and helium (Ar: He=96:4 (molar ratio)) (the charging internal pressure of 32,000 kPa)

Gas generating agent; 40 g (nitroguanidine:strontium nitrate:carboxymethyl cellulose:Japanese acid clay= 34:50:9:7; a single-perforated cylindrical shape having an outer diameter of 5.4 mm, an inner diameter of 0.7 mm and a length of 5 mm; the generated gas amount of 1.0 mol)

Opening area (B) of the rupturable plate 178 portion: 314 mm$^2$ (a diameter of 20 mm)

Comparative Example 1

The same hybrid inflator as that of Example 1 was produced except that four nozzles (the total opening area of 78.5 mm$^2$) with a diameter of 5 mm were formed and all the nozzles were open.

Test Example 1

Figure 3:
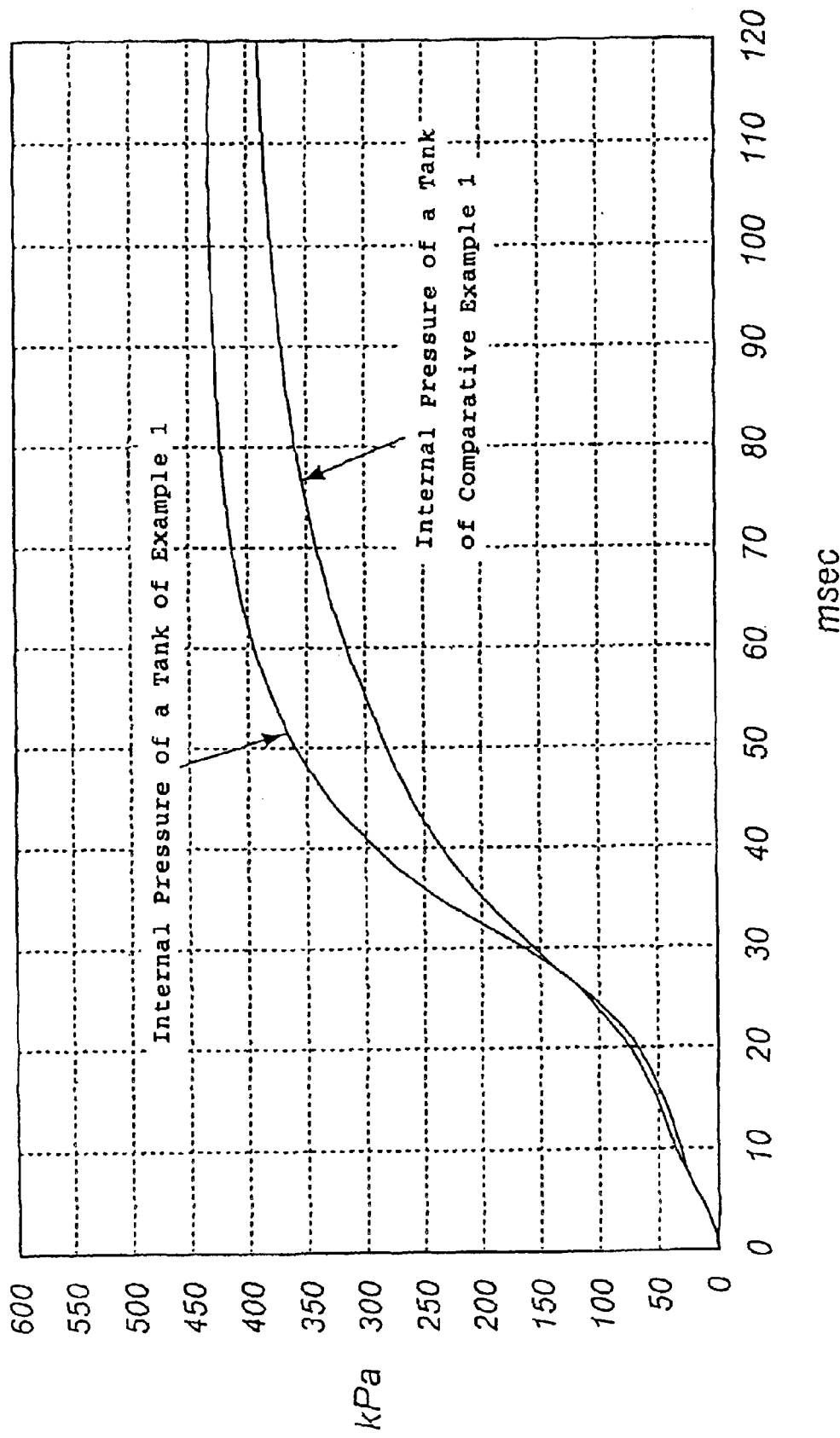
FIG. 3 is a graph showing curves of an internal pressure of a tank of Test Example 1.

60-liter tank tests were conducted at −35° C. using the hybrid inflators of Example 1 and Comparative example 1, changes of the internal pressures of the tanks were measured, and pressure curves shown in FIG. 3 were obtained. Incidentally, in the hybrid inflator of Example 1, all the stainless tapes closing the nozzles were ruptured after the test.

As obvious from the pressure curves shown in FIG. 3, it was confirmed that, when the hybrid inflator of Example 1 where the total opening area of the nozzles could be changed was applied to an air bag apparatus, the amount of outflow of the pressurized medium and the combustion gas could be controlled to be in a desirable state.

What is claimed is:

1. A hybrid inflator for an inflating-type safety system of a vehicle provided with an air bag, comprising:
    an inflator housing filled with a pressurized medium;
    a gas generator accommodated in the inflator housing and provided with at least one gas generating chamber including gas generating means;
    ignition means attached to the gas generator;
    a flow-passage that communicates an inner space defined by the inflator housing with an outside of the inflator housing, the flow passage having a plurality of nozzles for controlling an amount of flow of the pressurized medium and a combustion gas generated by the gas generating means;
    a rupturable plate that seals the flow passage for preventing the pressurized medium and the combustion gas from flowing to an outside of the inflator housing through the flow passage prior to an activation of the inflator; and
    shielding means that shields only some of the plurality of nozzles prior to the activation of the inflator, the shielding means adapted to compensate for an internal pressure of the pressurized medium, upon activation of the inflator, that changes due to changes in atmospheric temperature.

2. A hybrid inflator as claimed in claim 1, wherein said plurality of nozzles are provided in the flow-passage at an upstream side of the rupturable plate.

3. A hybrid inflator as claimed in claim 2, wherein the flow-passage upstream of the rupturable plate is formed of a cylindrical member, a first end of the cylindrical member opposes the rupturable plate while a second end of the cylindrical member is closed, and the plurality of nozzles are through-holes provided on a side wall of the cylindrical member.

4. A hybrid inflator as claimed in claim 2, wherein the flow-passage upstream of the rupturable plate is formed of a cylindrical member, a first end of the cylindrical member opposes the rupturable plate while a second end of the cylindrical member is provided with the plurality of nozzles.

5. A hybrid inflator as claimed in claim 2, wherein a portion of the flow-passage upstream of the rupturable plate is formed of a cylindrical member, and a first end of the cylindrical member faces the rupturable plate while a second end of the cylindrical member is provided with the plurality of nozzles including through-holes.

6. A hybrid inflator as claimed in claim 1, wherein the plurality of nozzles are provided in the flow-passage downstream of the rupturable plate.

7. A hybrid inflator as claimed in claim 6, wherein a portion of the flow-passage downstream of the rupturable plate is formed of a cylindrical member, and a first end of the cylindrical member opposes the rupturable plate while a second end of the cylindrical member is provided with a plurality of nozzles including through-holes.

8. A hybrid inflator as claimed in claim 6 or 7, wherein the flow-passage downstream of the rupturable plate is a discharging port for discharging the pressurized medium and the combustion gas from the hybrid inflator.

9. A hybrid inflator as claimed in claim 1, wherein respective opening areas of the plurality of nozzles are equal to each other.

10. A hybrid inflator as claimed in claim 1, wherein the shielding means is ruptured according to an increase in an internal pressure of the inflator at a time of activation.

11. A hybrid inflator as claimed in claim 6 or 10, wherein, pressures required for rupturing some or all the shielding means are different.

12. A hybrid inflator as claimed in claim 1, wherein the shielding means is a metal tape having a thickness of 30 to 300 μm.

13. An air bag apparatus, comprising:
an activation-signal outputting means including an impact sensor and a control unit; and
a module case accommodating therein a hybrid inflator as claimed in claim 1 and an air bag.

14. A hybrid inflator as claimed in claim 1, wherein respective opening areas of the plurality of the nozzles are different from one another.

* * * * *